United States Patent [19]

Rushmere

[11] Patent Number: 4,668,499
[45] Date of Patent: May 26, 1987

[54] PROCESS FOR MANUFACTURING HYDROGEN PEROXIDE

[75] Inventor: John D. Rushmere, Wilmington, Del.

[73] Assignee: E. I. Du Pont de Nemours and Company, Wilmington, Del.

[21] Appl. No.: 823,064

[22] Filed: Jan. 27, 1986

[51] Int. Cl.⁴ ............................................. C01B 15/02
[52] U.S. Cl. .................................................... 423/588
[58] Field of Search ......................................... 423/588

[56] References Cited

U.S. PATENT DOCUMENTS

| | | | |
|---|---|---|---|
| 3,098,714 | 7/1963 | Käbisch et al. | 423/588 |
| 3,295,928 | 1/1967 | Howe et al. | 423/588 |
| 3,307,909 | 3/1967 | Reilly | 423/588 |
| 3,912,766 | 10/1975 | Logan et al. | 423/588 |

FOREIGN PATENT DOCUMENTS

| | | | |
|---|---|---|---|
| 158558 | 1/1953 | Australia | 423/558 |
| 238324 | 12/1959 | Australia | 423/588 |
| 560630 | 7/1958 | Canada | 423/588 |
| 152695 | 12/1979 | Japan | 423/588 |
| 795272 | 5/1958 | United Kingdom | |
| 923884 | 4/1963 | United Kingdom | 423/588 |

Primary Examiner—John Doll
Assistant Examiner—Wayne A. Langel
Attorney, Agent, or Firm—Craig H. Evans

[57] ABSTRACT

The invention is an improvement to the cyclic anthraquinone process for making hydrogen peroxide comprising the addition of catalytically effective amounts of an additive to reoxidize inert quinone-degradation species to useful quinones. The additive comprises aromatic tertiary amines having an aqueous $pK_a$ value of about 4 to 9 and the general formula

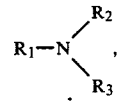

wherein $R_1$ is a substituted or unsubstituted phenyl group and $R_2$ and $R_3$ are the same or different alkyl groups containing 1 to 18 carbon atoms.

12 Claims, No Drawings

PROCESS FOR MANUFACTURING HYDROGEN PEROXIDE

DESCRIPTION

Technical Field

This invention relates to the anthraquinone process for making hydrogen peroxide and particularly to the addition of certain weakly-basic aromatic tertiary amines to catalyze oxidation of undesirable quinone-degradation products back to useful quinones.

BACKGROUND AND SUMMARY OF INVENTION

The anthraquinone process for making hydrogen peroxide is well known in the art to be a cyclic process in which quinones, dissolved in a solvent or mixture of solvents, are first hydrogenated in the presence of a hydrogenation catalyst to produce hydroquinones (hydrogenation stage or step). The hydroquinones are then oxidized to regenerate the original quinones with concomitant formation of hydrogen peroxide (oxidation stage or step). The hydrogen peroxide is removed, generally by water extraction (extraction stage or step) and the quinones are recycled.

The quinones, as used in this specification, include alkyl anthraquinones and alkyl tetrahydroanthraquinones. Thus, the resulting hydroquinones include the corresponding alkyl anthrahydroquinones and alkyl tetrahydroanthrahydroquinones. The hydrogenation catalysts and solvents are not critical to this invention and may be any which are disclosed in the art. The process may employ a slurry or fixed-bed hydrogenation catalyst.

The tetrahydroanthraquinones, which reduce to tetrahydroanthrahydroquinones, result from nuclear reduction of anthraquinones; that is, addition of hydrogen to the aromatic nucleus of the anthraquinone. Many have tried to reduce the formation of these "tetra" compounds because the tetrahydroanthrahydroquinones are slower in oxidizing back to tetrahydroquinones than the corresponding anthrahydroquinones are in oxidizing back to anthraquinones. See, for example, U.S. Pat. No. 2,730,533 in which a Raney nickel catalyst is treated with an amine, preferably an aliphatic amine, to prevent nuclear hydrogenation. Others have built processes around having a certain amount of the "tetra" compounds present with the anthraquinone. U.S. Pat. No. 2,995,424, for example, teaches a method of producing hydrogen peroxide from alkyl anthraquinones in which the working solution contains substantial amounts of tetrahydroanthraquinone. U.S. Pat. No. 2,995,424 employs a small amount of a water-soluble ionizable inorganic alkaline compound in the oxidation step as a catalyst to increase the rate of tetrahydroanthrahydroquinone oxidation.

The process of this invention will work regardless of "tetra" compound content in the working solution, but is particularly suited to the process in which "tetra" compounds are present. It is not directed at decreasing the products of nuclear hydrogenation. It is concerned with the other anthraquinone degradation species that result from overhydrogenation. Specifically these anthraquinone degradation species, also referred to as inert degradation compounds or species in this specification, are oxanthrones, the tautomers of anthrahydroquinones, and anthrones, the reduction products of oxanthrones. Further reductions also occur to make, in turn, anthranols and hydroanthracenes. Unlike the "tetra" compounds, these inert degradation species do not readily oxidize back to useful quinones and do not produce hydrogen peroxide in the normal cyclic operation of the process. As the degradation products become further reduced, the more difficult they become to reoxidize. The result is loss of valuable quinones from the process and a substantial cost penalty of operation. The inert degradation species must be removed and replaced with quinones if the desired hydrogen-peroxide-synthesizing capacity is to be maintained.

Since formation of inert degradation species is costly, much effort has been directed at avoiding their formation. Catalysts have been treated to make them more selective and substances have been added to the working solution in attempts to limit formation. Also, attempts have been made to convert the degraded compounds into useful compounds.

U.S. Pat. No. 3,098,714 teaches addition of water-soluble alkaline-reacting substances to the working solution, in the hydrogenation stage to increase the activity of the hydrogenation catalyst with a resulting reduction in by-product formation. The additive is expelled in the reduction or oxidation stage or lost during water extraction.

U.S. Pat. No. 3,307,909 teaches the admixture of a catalyst-free, solid particulate inorganic alkaline material which is insoluble in the working solvent with the hydrogenation catalyst to reduce inert degradation compound formation. This additive was removed with the hydrogenation catalyst prior to the oxidation stage.

British Pat. No. 795,272 teaches addition of an alkaline compound, particularly an organic amine, having a dissociation constant greater than $1 \times 10^{-10}$ to the organic solvent in the hydrogenation stage or the substitution of it for the organic solvent to reduce the rate of formation of inert degradation compounds. The additive must not be subject to hydrogenation under conditions of operation, must be a solvent for the quinones or be soluble in the organic solvent and preferably should be essentially immiscible with or insoluble in water.

U.S. Pat. No. 3,295,928 teaches regeneration of degraded working solution by the combined treatment of the solution with an organic or inorganic base which should be water soluble and an oxidizing agent after the hydrogen peroxide is extracted but before the solution is hydrogenated.

The process of this invention is not intended to prevent formation of inert degradation compounds as such. It is intended to minimize the buildup of inert degradation species, particularly oxanthrones and anthrones, by introducing an additive to catalyze their reoxidation to useful quinones. Preferably the additive should be such that it can be introduced at any stage of the anthraquinone cyclic process but not readily lost from the system during any stage. It should not contaminate the hydrogen peroxide product. To meet these objectives, the additive should be soluble in the working solution and resistant to hydrogenation in the presence of the hydrogenation catalyst. Additionally, it should be stable to oxidation by air or hydrogen peroxide and should be insoluble in and nonreactive with water and hydrogen peroxide, particularly at such adverse operating conditions as experienced in typical plant extraction units (i.e., at temperatures up to about 60° C. and hydrogen peroxide concentrations up to 35 weight percent). The process of this invention comprises the addition of aromatic tertiary amines which meet these conditions but still are basic enough to maintain a sufficient catalytic activity level to reoxidize the inert quinone-degradation species to useful quinones. Further, the addition of aromatic tertiary amines has shown other benefits. Specifically, they have been found to contribute to a more even level of noble-metal-hydrogenation-catalyst activity and selectivity. They have been found to be beneficial in regenerating the activity of catalyst which has become deactivated due to process upsets. The presence of the aromatic tertiary amine also enables a higher level of hydrogen peroxide recycle from the extractor than could previously have been tolerated. Without the aromatic tertiary amine, the noble-metal catalysts are prone to loss of activity and selectivity as a result of small increases of hydrogen peroxide in recycled working solution.

DETAILED DESCRIPTION OF INVENTION

The preferred additives of this invention are aromatic tertiary amines having an aqueous $pk_a$ value of about 4 to 9 and the general formula:

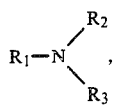

where $R_1$ is a phenyl group which may be substituted or unsubstituted and $R_2$ and $R_3$ are alkyl groups containing from 1-18 carbon atoms. Substituents of the phenyl group may be alkyl, aryl, or alkoxy. They may also be additional benzenoid groups to form polynuclear radicals such as napthyl or anthracyl. The $R_2$ and $R_3$ alkyl groups may be the same or different; may be straight chain, branched or cyclic; may be saturated or unsaturated; or may be joined and contain an oxygen atom.

Within this general description, the preferred aromatic tertiary amines are N,N-dialkylanilines in which the alkyl groups contain from 4 to 8 carbon atoms. The most preferred amine is N,N-di-n-butylaniline.

The aromatic tertiary amine is catalytically effective in reoxidizing inert quinone-degradation species to useful quinones at extremely low concentrations, expressed as weight percent of the working solution, but may be present in amounts up to about 5 weight percent. The preferred range for a commercial process is from about 0.0001 to 0.10 weight percent.

EXAMPLES

The following examples are given as further illustration of the invention but not by way of limitation.

EXAMPLES 1 through 12

This series of examples was designed to demonstrate (a) relative amine stability to oxidation under plant extraction-stage conditions and (b) relative activity in anthrone reoxidation. In each of the examples, oxidized and extracted plant working solution was used. This working solution was obtained from a commercial unit which employs both slurry and fixed-bed modes of hydrogenation. The hydrogenation catalyst used was a supported noble-metal catalyst (palladium on alumina). The quinone working solution was a mixture of butyl and amyl anthraquinones and butyl and amyl tetrahydroanthraquinones dissolved in a mixed organic solvent comprised of alkylated benzenes (Cyclosol ®) and an aliphatic alcohol (diisobutylcarbinol) together with inerts and degradation products. This working solution was hydrogenated and then oxidized with air at 50° to 60° C. and the hydrogen peroxide was extracted (see U.S. Pat. No. 2,995,424).

To test for amine stability to oxidation under plant extraction-stage conditions, a catalytic amount (0.01 grams) of amine was added to 10 grams of oxidized and extracted working solution. This 0.1 weight % mixture was then shaken with an equal volume of 35 weight % aqueous hydrogen peroxide in a stoppered bottle at 60° C. for 24 hours. The loss of amine from the working solution was monitored by means of gas chromatography.

To test for activity in anthrone reoxidation, a further portion of the oxidized and extracted working solution was fortified with 2 weight % 2-butylanthrone to represent a highly degraded condition. A catalytic amount (0.1 weight %) amine was added to the fortified working solution in a stoppered bottle which was filled with oxygen. The mixture was shaken for 24 hours at 60° C. under oxygen. The reoxidation of the 2-butylanthrone was followed by means of liquid chromatography. Disappearance of 2-butylanthrone was accompanied by a corresponding increase in 2-butylanthraquinone.

Table I shows the results of the series of tests. Example 1 is a control, that is, no amine was added. The remaining Examples employed the amine noted in the Table. Examples 2-5 represent amines disclosed in the prior art. Examples 6-12 represent amines of the present invention.

TABLE I

| | | | % Original Amount Remaining After 24 Hours | |
|---|---|---|---|---|
| Example | Amine | $pK_a$ | Amine | 2-Butyl-anthrone |
| 1 | Control | — | N/A | 76 |
| 2 | m-Toluidine | 4.7[1] | 7 | 78 |
| 3 | Diphenylamine | 0.9[1] | 96 | 82 |
| 4 | Tribenzylamine | No Value | 83 | 64 |
| 5 | Tributylamine | 10.9[1] | 2 | 0[3] |
| 6 | N,N—Di-n-hexyl-aniline | 5.0[2] | 86 | 36 |
| 7 | N,N—Di-n-butyl-aniline | 6.2[1] 5.2[2] | 76 | 13 |
| 8 | N,N—Diethyl-2-methylaniline | 5.3[2] | 43 | 15 |
| 9 | N,N—Di-n-butyl-4-octylaniline | 5.6[2] | 68 | 11 |
| 10 | N,N—Di-n-butyl-4-methylaniline | 5.8[2] | 71 | 10 |
| 11 | N,N—Diethyl-3-methylaniline | 6.0[2] | 55 | 5 |
| 12 | N,N—Di-n-butyl-3,4-dimethylaniline | 6.2[2] | 61 | 8 |

N/A = Not Applicable
[1]$pK_a$ values in water from Patai, S., "The Chemistry of Amino Groups,", Interscience Publishers, New York, New York (1968), Chapter 4.
[2]$pK_a$ values in 50/50 methanol/water determined by acid titration using glass electrode.
[3]Reaction was complete in three hours.

It may be seen that using the amines of the present invention (Examples 6-12) a step change over the prior art examples is obtained in achieving a balance between maximum stability of the amine in the process and its effectiveness in catalyzing the reoxidation of degradation products exemplified by 2-butylanthrone.

In general, an increasing trend in regeneration effectiveness is observed with increasing $pK_a$ value of the amine. However, this is offset by a declining trend in amine stability. On the basis of overall effectiveness combined with cost and availablity, N,N-di-n-butylaniline represents an optimum choice for application in a commercial process.

EXAMPLE 13

This example was designed to demonstrate the utility of the most preferred aromatic tertiary amine of this invention, N,N-di-n-butylaniline, in a cyclic anthraquinone process under commercial conditions.

A pilot plant facility, sized to be approximately 1/1000 that of a commercial unit, was charged with 1.5M lbs. of working solution withdrawn from the commercial unit. The working solution comprised a mixture of butyl and amyl anthraquinones and tetrahydroanthraquinones dissolved in a Cyclosol ®/diisobutylcarbinol solvent. Using plant Pd/Al$_2$O$_3$ slurry catalyst in the hydrogenator, operation of the pilot plant was commenced with a working solution flow of about 1.5 g.p.m. and at about 50° C. The average titer of the reduced working solution leaving the hydrogenator was about 38. "Titer" is an industrial term used as a measure of the depth or degree of reduction of the working solution, that is, the amount of hydroquinone formed expressed as LB. MOLS/10,000 gallons of working solution. Thirty-eight titer represents driving conditions for a commercial facility which is usually operated at 32 titer or less. As operating titer is increased, experience has shown that hydrogen peroxide production is increased but at the expense of increased quinone degradation and quinone use.

Over an initial operating period of two months in the pilot plant without amine addition, the anthrone content of the working solution increased steadily from 0.2 wt. % to 0.7 wt. % and was accompanied by a corresponding decrease in the quinone content of the working solution. Then, 0.05 wt. % of N,N-di-n-butylaniline was added to the pilot plant working solution hold tank. Over the next 36 hours a rapid drop in the anthrone content to about 0.2 wt. % was observed. An improvement in hydrogenation activity was also noted.

Operation of the pilot plant was continued at the 38 titer level for a further four and a half months with a daily production of about 250 lbs. hydrogen peroxide. The N,N-di-n-butylaniline content of the working solution was maintained at about 0.03 wt. % by means of small daily additions. The anthrone content remained between 0.1 and 0.2 wt. % for the entire period and there was no measurable loss of quinones. Other operating parameters such as yield and product quality were unaffected.

I claim:

1. In a cyclic process for the production of hydrogen peroxide involving hydrogenating a working solution comprising quinones dissolved in solvents in the presence of a hydrogenation catalyst, oxidizing the hydrogenated working solution, separating the hydrogen peroxide from the oxidized working solution and then recycling the working solution for further hydrogenation, the improvement comprising the addition of catalytically effective amounts of an additive to reoxidize inert quinone-degradation species to useful quinones, the additive comprising aromatic tertiary amines having an aqueous pK$_a$ value of about 4 to 9 and the general formula:

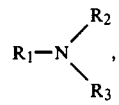

wherein R$_1$ is a substituted or unsubstituted phenyl group and R$_2$ and R$_3$ are the same or different alkyl groups containing from 1 to 18 carbon atoms.

2. The process of claim 1 wherein the aromatic tertiary amines are N,N-dialkylanilines, the alkyl groups containing 4 to 8 carbon atoms.

3. The process of claim 2 wherein the N,N-dialkylaniline is N,N-di-n-butylaniline.

4. The process of claim 1 wherein the catalytically effective amount of the additive is about 0.0001 to about 5.0 weight percent of the working solution.

5. The process of claim 4 wherein the amount of the additive is about 0.0001 to 0.10 weight percent of the working solution.

6. The process of claim 3 wherein the catalytically effective amount of the additive is about 0.0001 to about 5.0 weight percent of the working solution.

7. The process of claim 6 wherein the amount of the additive is about 0.0001 to 0.10 weight percent of the working solution.

8. The process of claim 1 wherein the quinones are a mixture of alkyl anthraquinones and alkyl tetrahydroanthraquinones and the hydrogenation catalyst is a noble-metal catalyst.

9. The process of claim 4 wherein the quinones are a mixture of alkyl anthraquinones and alkyl tetrahydroanthraquinones and the hydrogenation catalyst is a noble-metal catalyst.

10. The process of claim 5 wherein the quinones are a mixture of alkyl anthraquinones and alkyl tetrahydroanthraquinones and the hydrogenation catalyst is a noble-metal catalyst.

11. The process of claim 6 wherein the quinones are a mixture of alkyl anthraquinones and alkyl tetrahydroanthraquinones and the hydrogenation catalyst is a noble-metal catalyst.

12. The process of claim 7 wherein the quinones are a mixture of alkyl anthraquinones and alkyl tetrahydroanthraquinones and the hydrogenation catalyst is a noble-metal catalyst.

* * * * *